US012460600B2

(12) United States Patent
MacDonald et al.

(10) Patent No.: US 12,460,600 B2
(45) Date of Patent: Nov. 4, 2025

(54) ENGINE DISPLACER WITH REGENERATOR CHANNELS

(71) Applicant: Ekstera Inc., Toronto (CA)

(72) Inventors: Brendan David MacDonald, Toronto (CA); Brayden Timothy York, Milford (CA)

(73) Assignee: Ekstera Inc., Toronto (CA)

( * ) Notice: Subject to any disclaimer, the term of this patent is extended or adjusted under 35 U.S.C. 154(b) by 0 days.

(21) Appl. No.: 18/617,518

(22) Filed: Mar. 26, 2024

(65) Prior Publication Data

US 2025/0305468 A1 Oct. 2, 2025

(51) Int. Cl.

| | |
|---|---|
| ***F02G 1/05*** | (2006.01) |
| ***F02G 1/053*** | (2006.01) |
| ***F02G 1/057*** | (2006.01) |
| ***F16J 1/00*** | (2006.01) |

(52) U.S. Cl.

CPC ............ *F02G 1/057* (2013.01); *F02G 1/053* (2013.01); *F16J 1/005* (2013.01); *F02G 2243/02* (2013.01); *F02G 2270/30* (2013.01)

(58) Field of Classification Search

CPC .. F02G 1/053; F02G 2270/30; F02G 2243/02; F16J 1/005

See application file for complete search history.

(56) References Cited

U.S. PATENT DOCUMENTS

| | | | | |
|---|---|---|---|---|
| 3,405,521 | A | 10/1968 | Kelly | |
| 3,407,593 | A | 10/1968 | Kelly | |
| 8,584,455 | B2 * | 11/2013 | Tai | F25B 9/14 60/517 |
| 10,087,883 | B2 | 10/2018 | Holsapple | |
| 10,787,992 | B1 * | 9/2020 | Chen | F02G 1/057 |
| 2016/0281638 | A1 * | 9/2016 | Holsapple | F02G 1/057 |

FOREIGN PATENT DOCUMENTS

| | | | |
|---|---|---|---|
| DE | 3536710 | A1 | 4/1987 |
| JP | 57028848 | A | 2/1982 |
| TW | I690653 | B | 4/2020 |

* cited by examiner

*Primary Examiner* — Abiy Teka

(74) *Attorney, Agent, or Firm* — SMART & BIGGAR LP; Tonino Rosario Orsi

(57) ABSTRACT

A displacer for an engine includes a body extending along a displacer longitudinal axis from a displacer first end surface to a displacer second end surface. At least one channel extends between a first opening in the displacer first end surface and a second opening in the displacer second end surface and has sidewalls therebetween defining a channel flow path. The first opening is located at a first radial distance from the displacer longitudinal axis in a first radial direction and the second opening is located at a second radial distance from the displacer longitudinal axis in a second radial direction. At least a portion of the channel flow path has a component in an angular direction that is at an angle to both the first and second radial directions.

23 Claims, 8 Drawing Sheets

ENGINE DISPLACER WITH REGENERATOR CHANNELS

FIELD

The various embodiments described herein generally relate to thermodynamic engine components. More specifically, the various embodiments relate to a displacer for an engine with regenerator channels.

INTRODUCTION

Stirling engines convert thermal energy into mechanical work. Some Stirling engines include a piston housed within a piston chamber and connected to a main engine shaft. The piston is responsible for the power of the engine. Some Stirling engines (e.g., gamma and beta Stirling engines) also include a displacer housed within a displacer chamber and connected to the main engine shaft. The displacer shuffles a working fluid between hot and cold sides of the displacer chamber, where the working fluid will expand or compress. Pressure changes developed in the displacer chamber by the temperature changes and the expansion or compression of the working fluid result in a net work output.

A key aspect of an efficient Stirling engine is the ability to transfer heat to and from the working fluid, since this impacts the expansion and compression of the working fluid and ultimately the performance of the engine. Accordingly, there is a desire for a displacer and displacer chamber with improved heat transfer ability.

SUMMARY OF VARIOUS EMBODIMENTS

According to one broad aspect of the teachings herein, in at least one embodiment described herein there is provided a displacer for an engine. The displacer includes: a body extending along a displacer longitudinal axis from a displacer first end surface to a displacer second end surface and at least one channel extending between a first opening in the displacer first end surface and a second opening in the displacer second end surface and having sidewalls therebetween defining a channel flow path. The first opening is located at a first radial distance from the displacer longitudinal axis in a first radial direction and the second opening is located at a second radial distance from the displacer longitudinal axis in a second radial direction. At least a portion of the channel flow path has a component in an angular direction that is at an angle to both the first and second radial directions.

In at least one embodiment, the component extends an entirety of the channel flow path.

In at least one embodiment, a portion of the channel flow path is parallel to the displacer longitudinal axis.

In at least one embodiment, the body includes at least three channels.

In at least one embodiment, each of the at least one channels has a circular cross-section.

In at least one embodiment, the cross-section of at least one of the at least one channels is constant along the channel flow path.

In at least one embodiment, the cross-section of at least one of the at least one channels varies along the channel flow path.

In at least one embodiment, the cross-section of at least one of the at least one channels narrows towards the displacer first and second end surfaces.

In at least one embodiment, the displacer further includes a displacer shaft, the displacer shaft extending from the displacer first end surface along the displacer longitudinal axis.

In at least one embodiment, the first and second radial distances are different.

In at least one embodiment, the displacer further includes a regenerator contained within each of the at least one channels.

In at least one embodiment, the regenerator forms a portion of the sidewalls of the at least one channel.

In at least one embodiment, the regenerator is contained within the sidewalls of the at least one channel.

In at least one embodiment, the body is solid and apertures in the body provide the sidewalls for the at least one channel.

In at least one embodiment, the engine is at least one of a Stirling engine and an Ericsson engine.

According to one broad aspect of the teachings herein, in at least one embodiment described herein there is provided an engine assembly. The engine assembly includes a displacer. The displacer includes: a body having a displacer first end surface, a displacer second end surface and a displacer longitudinal axis; and at least one channel extending between a first opening in the displacer first end surface and a second opening in the displacer second end surface and having sidewalls therebetween defining a channel flow path. The first opening is located at a first radial distance from the displacer longitudinal axis in a first radial direction and the second opening is located at a second radial distance from the displacer longitudinal axis in a second radial direction. At least a portion of the channel flow path has a component in an angular direction that is at an angle to both the first and second radial directions. The engine assembly further includes a displacer chamber forming an internal cavity, wherein, in the assembled position, the body of the displacer is housed within the internal cavity.

In at least one embodiment, the component extends an entirety of the channel flow path.

In at least one embodiment, a portion of the channel flow path is parallel to the displacer longitudinal axis.

In at least one embodiment, the body includes at least three channels.

According to one broad aspect of the teachings herein, in at least one embodiment described herein there is provided displacer for moving a working fluid in a displacer chamber. The displacer includes: a body with a displacer first end surface at one end, a displacer second end surface at another end and a displacer longitudinal axis; and at least one channel extending between the displacer first end surface and displacer second end surface. The at least one channel defines a channel flow path for the working fluid through the displacer. The at least one channel is angled in the azimuthal direction to force the working fluid to swirl as it exits the channel.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
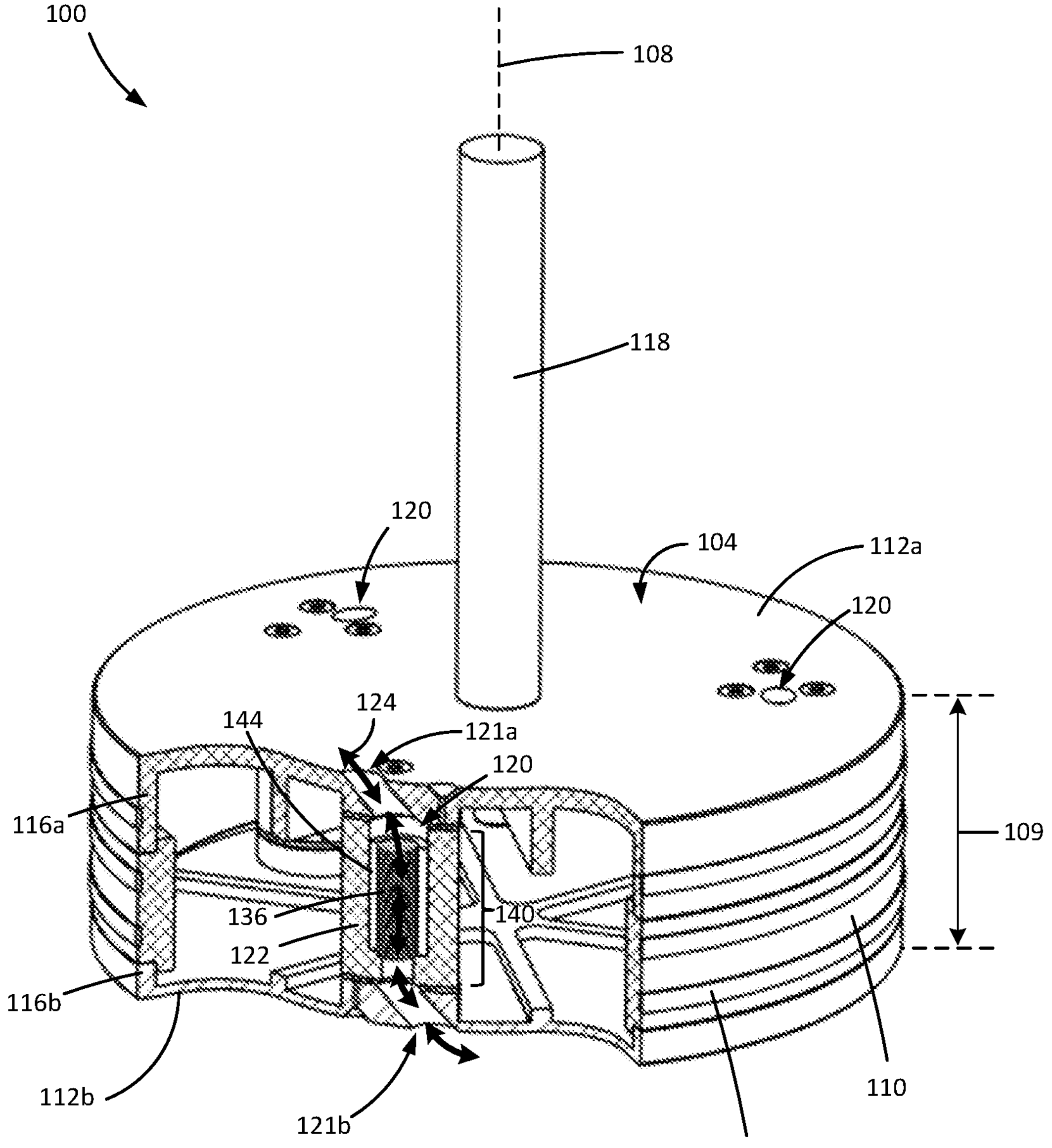
FIG. 1 is a cut-away perspective view of a displacer according to an example embodiment.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices or methods having all of the features of any one of the devices or methods described below or to features common to multiple or all of the devices and or methods described herein. It is possible that there may be a device or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electric signal, an electrical connection, a mechanical element, a fluid or a fluid transport pathway, for example, depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof. As another example, the phrases "A, B, C or any operable combination thereof" or "any combination of A, B and C" are meant to cover any combination of elements A, B and C that provides utility which may, for example, include A, B, C, A and B, A and C, B and C, or A, B and C.

It should be noted that terms of degree such as "substantially", "about" and "approximately" as used herein mean a reasonable amount of deviation of the modified term such that the end result is not significantly changed. These terms of degree may also be construed as including a deviation of the modified term such as, but not limited to, 1%, 2%, 5% or 10%, if this deviation would not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as, but not limited to, 1%, 2%, 5% or 10%, for example.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

Reference is now made to FIG. 1, which shows a displacer 100. The displacer 100 has a body 104. The body 104 extends along a displacer longitudinal axis 108 from a displacer first end surface 112*a* to a displacer second end surface 112*b*. FIG. 1 shows the displacer first end surface 112*a* vertically above and spaced apart from the displacer second end surface 112*b*. It will be understood that since the functioning of the displacer 100 does not depend on the use of gravity, the displacer 100 may be oriented in any suitable direction (e.g., with the displacer first end surface 112*a* below the displacer second end surface 112*b*, with the displacer first and second end surfaces 112*a*, 112*b* at an angle relative to the horizontal, etc.).

The body 104 may be any suitable shape. In the example embodiments shown herein, the body 104 is cylindrical and the displacer longitudinal axis 108 extends in the axial direction (e.g., along the longitudinal direction of the displacer). The body 104 has a displacer axial length 109 and displacer diameter 111 (e.g., see FIG. 2) or a displacer perimeter. As shown, the body 104 has a barrel portion 110 and displacer first and second end surfaces 112*a*, 112*b* form ends (i.e., end caps or heads), which are circular and planar (i.e., flat) in this example, of the barrel portion 110. In other examples, the first and second end surfaces 112 may not be flat, but may have other forms (e.g., domed). In some embodiments, such as in FIG. 1, the body 104 is generally hollow. In other embodiments, such as in FIGS. 4 and 8, the body 104 is generally solid.

Referring back to FIG. 1, the displacer first and second end surfaces 112 extend in a radial direction with respect to the displacer axis. In other words, the displacer first and second end surfaces 112 extend outwardly from a center point of the displacer first and second end surfaces end 112. In some embodiments, such as in FIG. 1, the body 104 may further comprise lips 116*a*, 116*b* for connecting the displacer first and second end surfaces 112*a*, 112*b*, respectively, to the barrel portion 110.

In some embodiments, the displacer second end surface 112*b* and lip 116*b* are made of steel, and the barrel portion 110, displacer first end surface 112*a* and lip 116*a* are made of aluminum. Aluminum may be used as it is a relatively lighter material than steel. However, steel may be preferably used on portions of the displacer that are exposed to more heat since steel can withstand higher temperatures and expands less when exposed to heat compared to aluminum. In some examples, portions of the displacer 100 may be stainless steel, titanium, Inconel®, Monel®, or any other suitable material.

The displacer 100 also includes a displacer shaft 118. The displacer shaft 118 extends from the displacer first end surface 112*a* along the displacer longitudinal axis 108. The displacer shaft 118 connects the displacer 100 to a main engine shaft (not shown).

Figure 7:
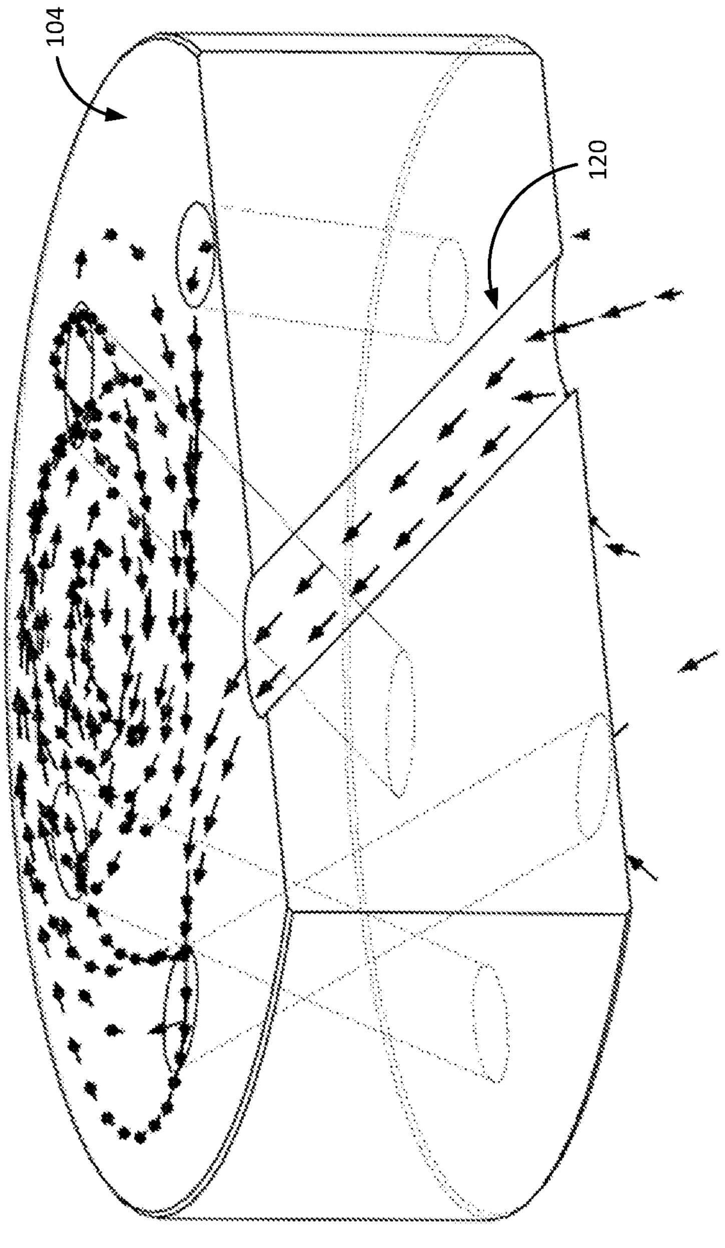
FIG. 7 is a schematic diagram of the working fluid flow through the displacer of FIG. 4.
Figure 9:
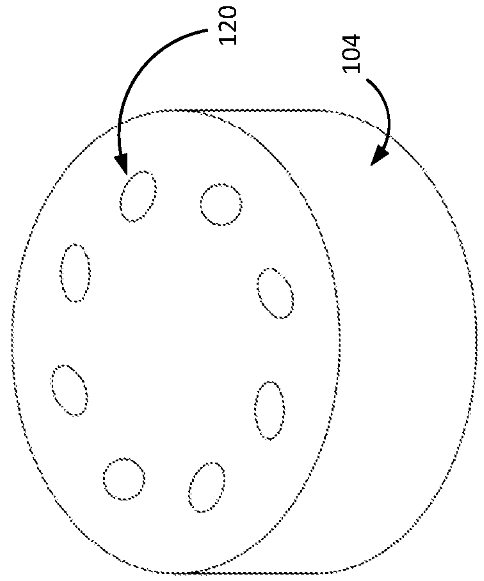
FIG. 9 is a top perspective view of the displacer of FIG. 8.
Figure 8:
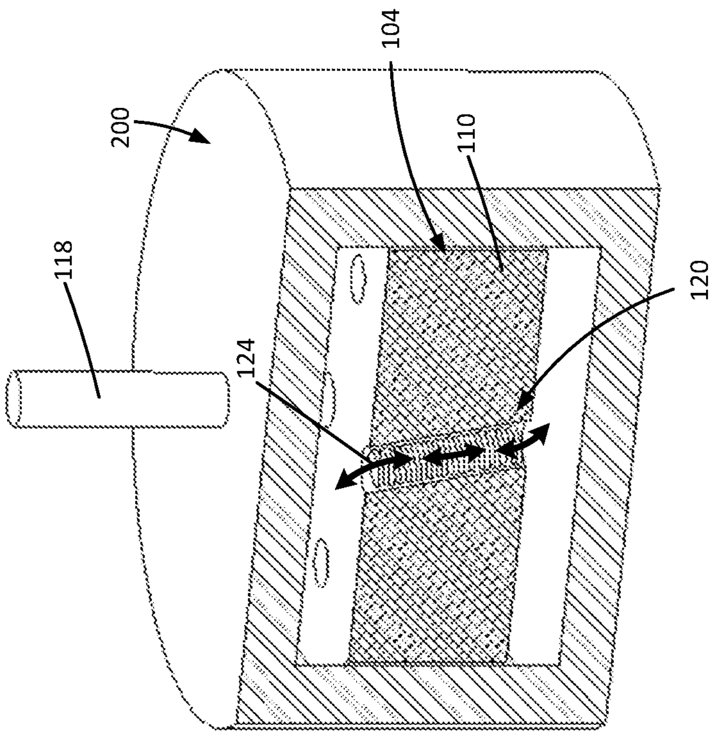
FIG. 8 is a cross-sectional perspective view of an example displacer and displacer chamber according to another example embodiment.

The displacer 100 has at least one channel 120. In some embodiments, the displacer 100 has three channels 120 (FIG. 1), five channels (FIGS. 4-7 and 10-12), or eight channels (FIGS. 8-9). The number of channels 120 may depend on the required thermal mass ratio of a regenerator 136 (described below) to the working fluid, regenerator mesh density, dead volume, and space constraints. The channels 120 extend between the displacer first end surface 112*a* and the displacer second end surface 112*b*. In particular, each of the channels 120 extends between a first channel opening 121*a* in the displacer first end surface 112*a* and a second channel opening 121*b* in the displacer second end surface 112*b*. In embodiments where the body 104 is generally hollow, as in FIG. 1, side walls 122 form each of the channels 120. In embodiments where the body 104 is generally solid, as in FIG. 4, holes are formed in the solid barrel portion 110 to define each of the channels 120.

The sidewalls of the channels 120 define a channel flow path 124 (i.e., a flow path for the working fluid through a channel 120). Under different operating conditions, the working fluid may flow through the channels 120 in either direction (i.e., from the displacer first end surface 112*a* towards the displacer second end surface 112*b*, or from the displacer second end surface 112*b* towards the displacer first end surface 112*a*), as described further below.

Figure 2:
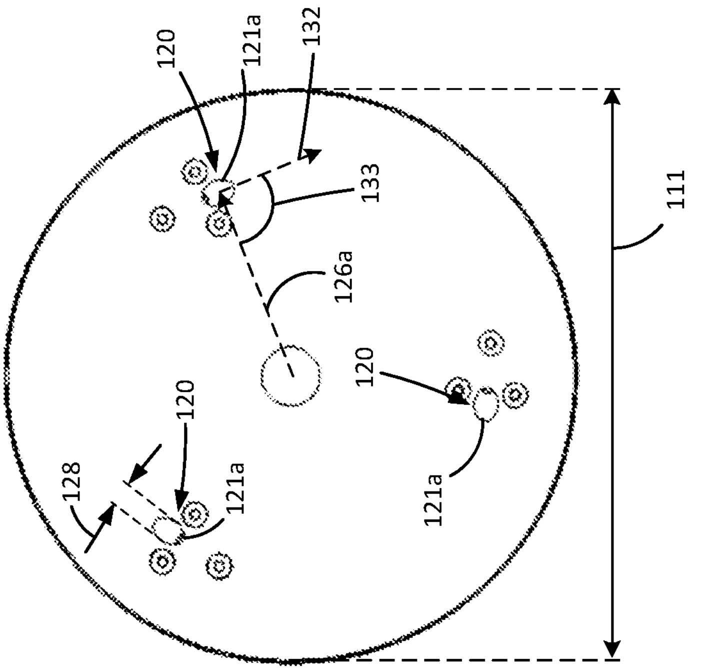
FIG. 2 is a top view of the displacer of FIG. 1.
Figure 5:
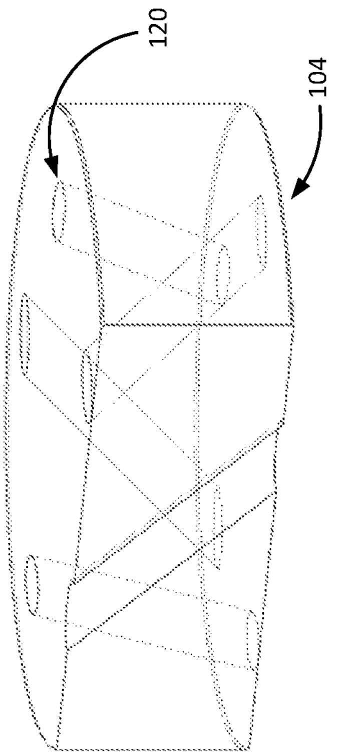
FIG. 5 is a cross-sectional perspective schematic diagram of a portion of the displacer of FIG. 4.
Figure 6:
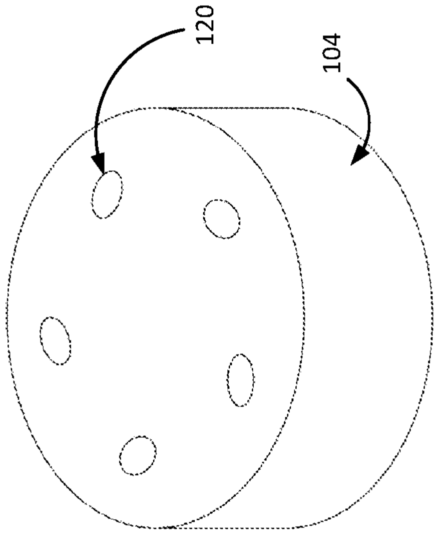
FIG. 6 is a top perspective view of the displacer of FIG. 4.

Referring to FIG. 2, each of the first channel openings 121*a* is located at a first radial distance 126*a* relative to the center point of the displacer first end surface 112*a*. Similarly, each of the second channel openings 121*b* is located at a second radial distance 126*b* relative to the center point of the displacer second end surface 112*b*. The first and second radial distances 126*a*, 126*b* may be any suitable distance that is greater than zero (i.e., the center of the first and second channel openings 121*a*, 121*b* are not to be located at the center point of the displacer first and second end surfaces 112*a*, 112*b*). If the displacer 100 includes more than one channel 120, as in FIG. 2 for example, the radial distance 126*a* from the center point to each first channel opening 121*a* may be the same first radial distance or different first radial distances. FIG. 2 shows the first channel openings 121*a* all at the same first radial distance 126*a*. Similarly, the second radial distance 126*b* from the center point to each second channel opening 121*b* may be the same second radial distance or different second radial distances. In some embodiments, for example, in the embodiment of FIG. 1, the first radial distance 126*a* is approximately equal to the second radial distance 126*b*. In other embodiments, the first radial distance 126*a* may be greater or less than the second radial distance 126*b*.

Figure 11:
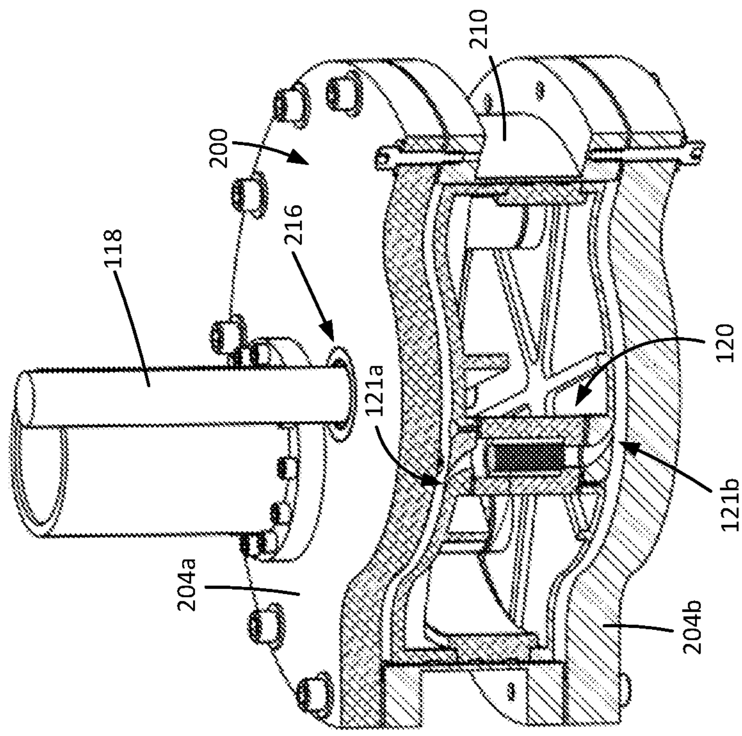
FIG. 11 is a cut-away perspective view of the displacer and displacer chamber of FIG. 10.
Figure 10:
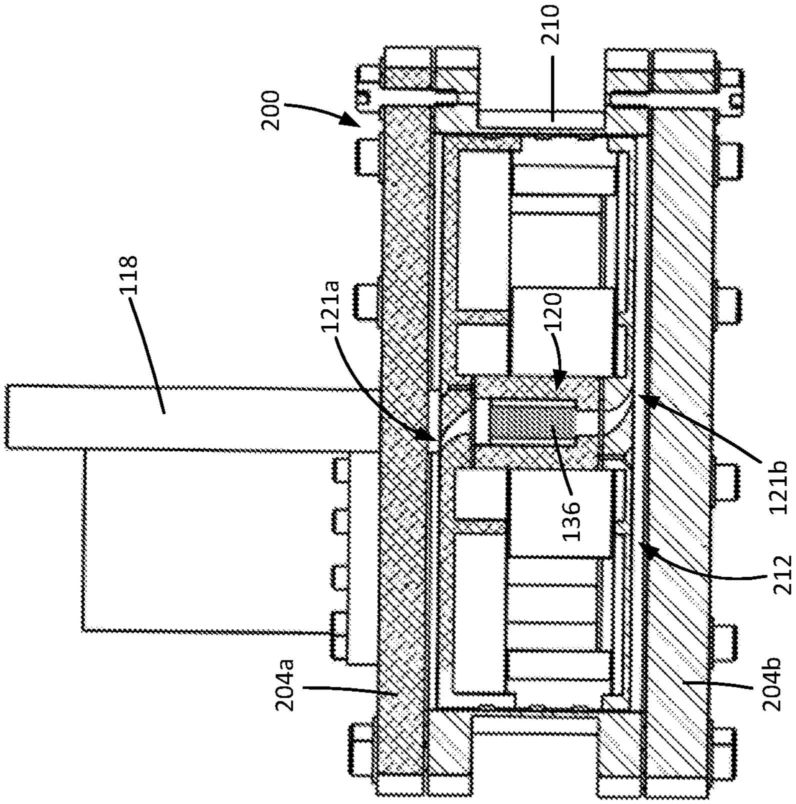
FIG. 10 is a side view of a displacer and displacer chamber according to another example embodiment.
Figure 12:
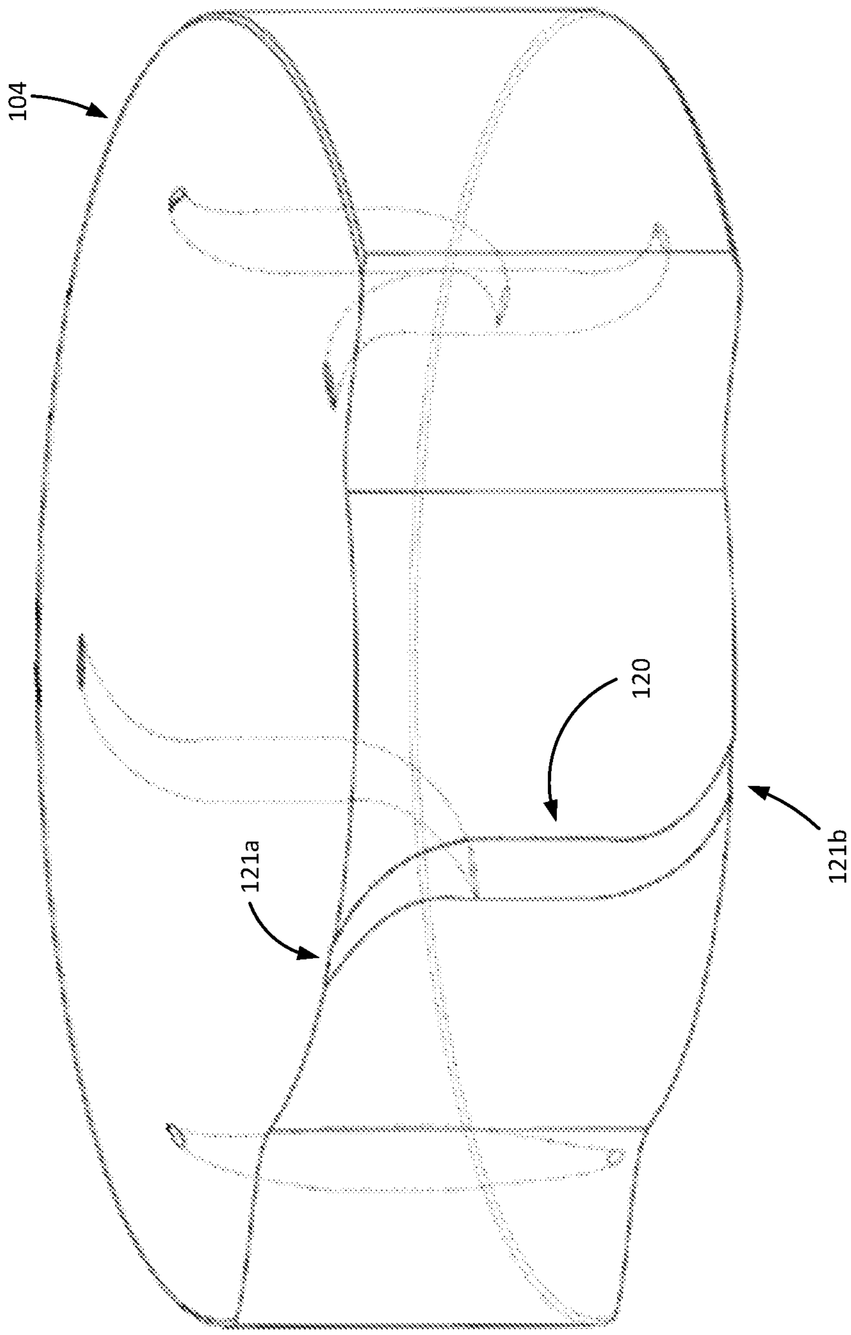
FIG. 12 is a cut-away perspective schematic diagram of a displacer according to another example embodiment.

The channels 120 may have different cross-sections in different embodiments. As can be seen in FIG. 2, each of the channels 120 has a circular cross-section, with a diameter 128. In other embodiments, the cross-section could be elliptical or have other shapes. In particular, the cross-section may be elliptical, with a major axis in the radial direction and a minor axis in the angular/azimuthal direction (described further below). In some embodiments, such as in FIG. 1, the cross-section of the channels 120 remains constant along the entire channel 120 (i.e., the diameter 128 remains constant along the entire channel path 124). In other embodiments, the cross-section may not remain constant along the entire channel 120. For example, as shown in FIGS. 10-12, the diameter 128 may decrease towards each of the displacer first and second end surfaces 112. This decrease in the diameter 128 would cause the velocity of the fluid exiting the channel 120 to increase, which ultimately results in more heat transfer, as described further below.

In the embodiments described herein, at least a portion of the channels 120 are angled relative to the radial direction. In particular, at least a portion of the channel 120 (and therefore also a portion of the channel flow path 124) has a component (i.e., segment) in a direction that is generally at an angle to the radial direction in the azimuthal (i.e., angular) direction (i.e., in a generally azimuthal direction 132). In other words, the channel 120 has at least a portion with a component in a direction that is at an angle 133 to the radial direction (FIG. 2). The angle 133 is the angle between the first radial distance 126*a* and the generally azimuthal direction 132. For example, FIG. 2 shows the first opening 121*a* in which the channel 120 at the opening 121*a* will extend in the generally azimuthal direction 132. The generally azimuthal direction 132 may not be perfectly azimuthal (at a ninety-degree angle) to the radial direction. As referred to herein, being "generally azimuthal" to the radial direction means that the angle 133 is non-zero.

In particular, the portions of the channels 120 that are near the channel openings 121 may have a component in a direction that is generally in the azimuthal direction. Having the channels 120 be angled near the channel openings 121 allows for the working fluid exiting the channel openings 121 to swirl, as described further below. Providing channels 120 with sharper angles near the channel openings 121 may also cause the working fluid to swirl more vigorously as it exits the channel openings 121 (see, for example, FIGS. 10-12).

Figure 4:
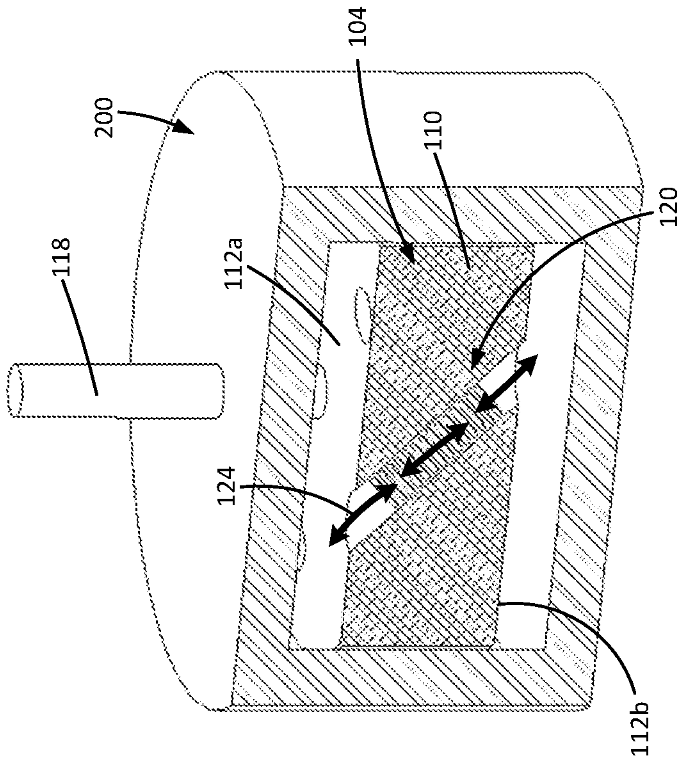
FIG. 4 is a cross-sectional perspective view of an example displacer and displacer chamber according to another example embodiment.

In some embodiments, for example in FIGS. 4 and 8, the entirety of the channel flow path 124 has a component in a generally azimuthal direction (i.e., the entire channel 120 has a component in the generally azimuthal direction). In other embodiments, for example in FIG. 1, only a portion of the channel flow path 124 has a component in the generally azimuthal direction. In FIG. 1, for example, a portion 140 of the channel flow path 124 extends only in an axial direction (shown as vertical in FIG. 1).

In some embodiments, a regenerator 136 is contained within each of the channels 120. In other embodiments, the walls (e.g., sidewalls 122) of the channels 120 may act as regenerators. The regenerator 136 can be any material that stores heat and is usually a porous material, for example, steel mesh, steel wool, or any metal (e.g., copper) fibrous materials. In the example shown in FIG. 1, the regenerator 136 comprises a plurality of mesh discs. In other examples, the regenerator 136 may have other structures, such as spiral or annular. If the regenerator 136 is annular, the regenerator 136 may form at least a portion of the sidewalls 122. The regenerator 136 may be disposed along about one-fifth, about one-quarter or more of the channel flow path 124. The proportion of the length of the regenerator to the length of the channel flow path 124 may be determined on the thermodynamic design of the displacer. In some embodiments, such as in FIG. 1, the regenerator 136 is contained within the portion 140. In other embodiments, such as in FIGS. 4 and 8, the regenerator 136 is contained within a central portion of the channel flow path 124 (i.e., the regenerator 136 is generally centered within the channel flow path 124). In other embodiments, the regenerator 136 may not be centered within the channel flow path 124. The regenerator 136 may be thermally insulated with insulation 144 (FIG. 1). For example, the insulation 144 may be a ceramic sleeve.

Figure 3:
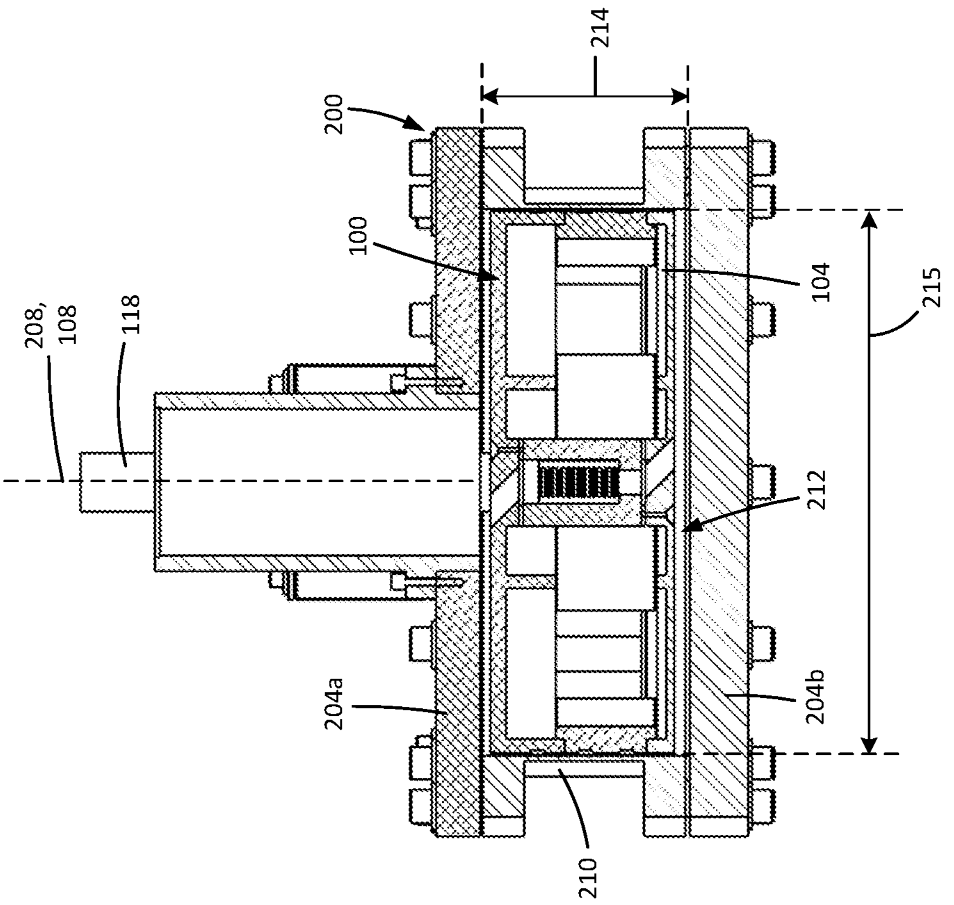
FIG. 3 is a cross-sectional side view of the displacer of FIG. 1 placed within a displacer chamber.

Reference is now made to FIG. 3, which shows the displacer 100 inside a displacer chamber 200. The displacer chamber 200 has a chamber first face 204*a* and a displacer second face 204*b*. The chamber first face 204*a* is spaced apart from the chamber second face 204*b* along a chamber axis 208. When the displacer 100 is placed within the displacer chamber 200, the displacer longitudinal axis 108 and chamber axis 208 are co-axial. The displacer chamber 200 also has a chamber barrel portion 210. Together, the chamber barrel portion 210 and chamber first and second faces 204*a*, 204*b* form an internal cavity 212. The internal cavity 212 has a cavity length 214 and cavity diameter 215.

The displacer chamber 200 has an aperture 216 in the chamber first face 204*a*. When the displacer 100 is inside the displacer chamber 200, the shaft 118 passes through the aperture 216, as shown in FIG. 11.

When the displacer 100 is inside the displacer chamber 200, the body 104 fits within the internal cavity 212. The cavity length 214 is greater than the displacer axial length 109, such that the displacer 100 may move axially within the internal cavity 212. The cavity diameter 215 is slightly larger than the displacer diameter 111, such that the displacer 100 has a close sliding fit with the chamber barrel portion 210 and does not move radially within the displacer chamber 200. In some embodiments, a wear ring 144 (e.g., see FIG. 1) or seal may be used to seal the displacer 100 against the chamber barrel portion 210.

In operation, an external heat source (not shown) is placed proximally to the chamber second face 204*b*, and an external heat sink (not shown) is placed proximally to the chamber first face 204*a*. Accordingly, the end of the displacer chamber 200 containing the chamber second face 204*b* may be referred to as the "hot end" containing the "hot face", and the end of the displacer chamber 200 containing the chamber first face 204*a* may be referred to as the "cold end" containing the "cold face".

Figure 13:
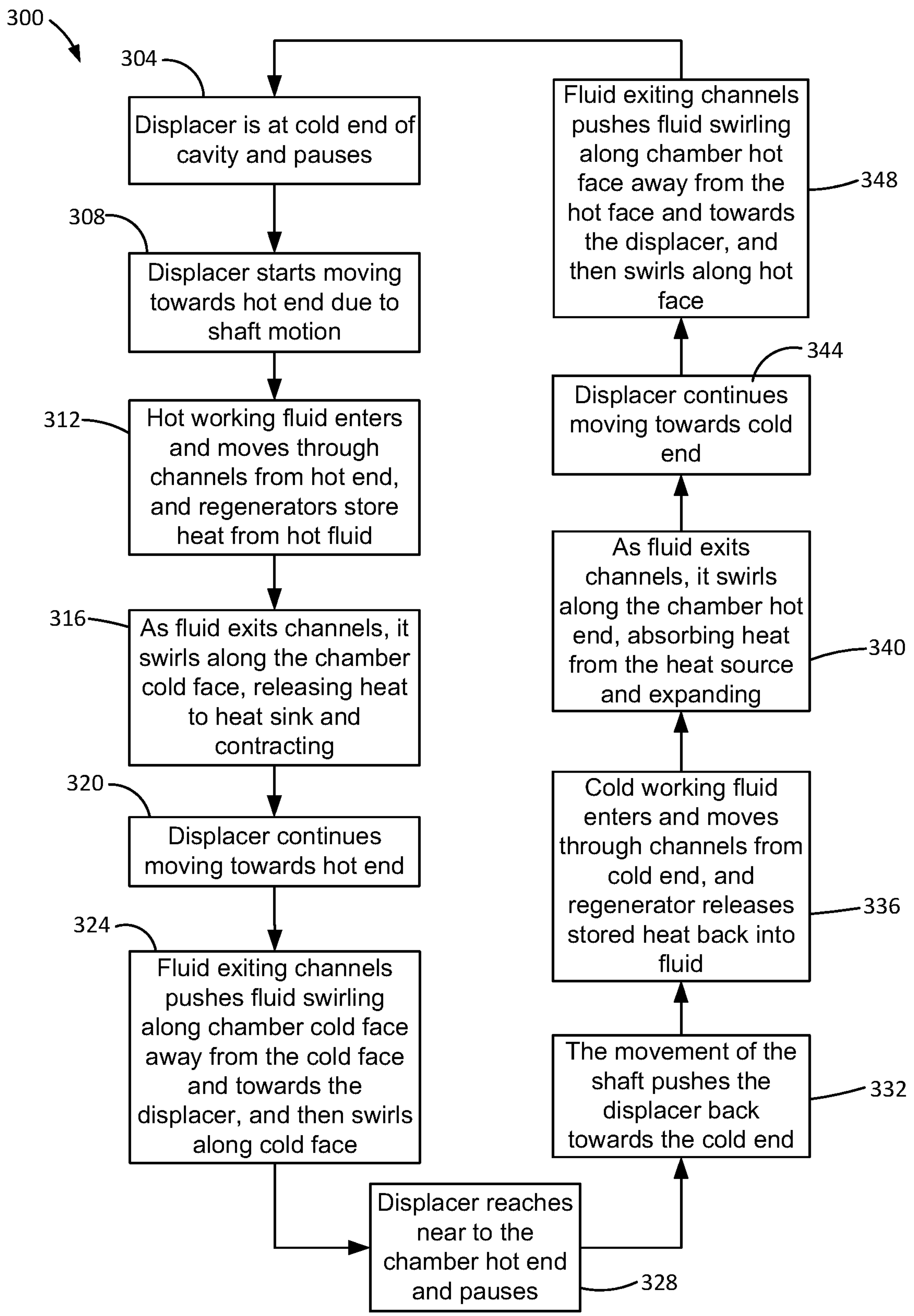
FIG. 13 is a process flow for the operation of a displacer within a displacer chamber.

Reference is now made to FIG. 13, which is a flowchart illustrating an example embodiment of a method 300 of operating a displacer within a displacer chamber. For example, the method 300 may be used to operate the displacer 100 within the displacer chamber 200. For ease of illustration, reference is made to the embodiment of FIGS. 1-3, but method 300 can apply to any other embodiment described herein.

The method 300 may start at step 304. At step 304, the displacer (e.g., displacer 100) is at the cold end of the internal cavity (e.g., near chamber first face 204*a* in internal cavity 212) and pauses. The internal cavity 212 also holds a working fluid, such as air. When the displacer 100 is at the cold end of the internal cavity 212, a majority of the working fluid is at the hot end (e.g., near chamber second face 204*b*) and being warmed by the external heat source.

At step 308, the displacer 100 begins moving quickly in the internal cavity 212 towards the hot end. This movement is caused by the movement of the displacer shaft 118. The displacer shaft 118 moves linearly due to its connection to the main engine shaft. The displacer shaft 118 may be connected to the main engine shaft via a crankshaft, grooved cam, or other device that generates linear motion from the rotation of the main engine shaft.

At step 312, as the displacer 100 moves towards the hot end, the hot working fluid is forced into the channels (e.g., channels 120) of the displacer 100. The hot working fluid moves quickly through the channels 120 (e.g., along channel flow path 124) and through regenerators (e.g., regenerators 136 or sidewalls 122 acting as regenerators, as described above) within at least one of the channels. As the hot working fluid moves over the regenerators, the regenerators absorb and store some of the heat from the working fluid. As previously described, the displacer 100 has a close sliding fit with the chamber barrel portion 210. Due to this design, most of the working fluid moves through the channels 120 rather than moving between the displacer 100 and the chamber barrel portion 210.

At step 316, the hot working fluid exits the channels 120. Since the channels 120 have a component (i.e., segment) in the generally azimuthal direction, the exiting fluid swirls along the cold face of the internal cavity (e.g., first face 204*a*). FIG. 7 is a schematic representation of the swirling of the working fluid as it exits a channel 120. As the hot working fluid swirls against the cold surface, heat is transferred from the hot working fluid to the heat sink. Having the working fluid swirl along the cavity face is beneficial since the working fluid can travel at a fast speed along the face. Since convective heat transfer is related to the velocity of the fluid, more heat is able to be transferred. Swirling fluid is also more effective than fluid that hits the cold surface directly. For example, if the channels 120 did not have a azimuthal component, for each channel 120, fluid would exit the channel 120 and hit the end surface (e.g., first face 204*a*) of the internal cavity straight on. The fluid would then jet out in every direction at multiple points on the end surface, colliding with each other and minimizing the heat transfer. By having channels 120 with end portions that are angled in an azimuthal direction, all of the working fluid exiting the channels swirls together, increasing the heat transfer. Having two or more channels 120 helps keep the swirling of the fluid balanced within the internal cavity 212.

Referring back to FIG. 13, at step 320, the displacer continues moving towards the hot end of the chamber.

At step 324, the working fluid continues exiting the openings of the channels 120. The exiting hot fluid displaces the fluid swirling along the cold face (e.g., chamber first face 204*a*) of the internal cavity 212 (i.e., fluid that is cooling) away from the cold face and back towards the displacer 100 (i.e., back towards displacer first end surface 112*a*). In doing so, the exiting hot fluid can then swirl along the cool face of the cavity. In other words, as the hot fluid exits the channels 120, layers of swirling fluid are created on the cold side of the chamber 200.

At step 328, the displacer 100 reaches near to the chamber hot end of the displacer chamber 200 and pauses. During this pause, the swirling fluid can continue to swirl and transfer heat.

At step 332, the movement of the displacer shaft 118 causes the displacer to begin moving back towards the cold end (e.g., towards chamber first face 204*a*) of the displacer chamber 200.

At step 336, as the displacer 100 moves towards the cold end of the displacer chamber 200, the cold working fluid is forced into the channels 120 of the displacer. The cold working fluid moves quickly through the channels 120 and through the regenerators 136 within each of the channels 120. As the cold working fluid moves over the regenerators 136, the regenerators 136 release the stored heat back to the cold working fluid.

At step 340, the cold working fluid exits the channels 120. Since the exit portions of the channels 120 adjacent the openings of the channels 120 have a component in the azimuthal direction, the exiting fluid swirls along the hot face (e.g., chamber second face 204*b*) of the internal cavity 212. As the cold working fluid swirls against the hot surface, heat is transferred to the cold working fluid from the heat source.

At step 344, the displacer 100 continues moving towards the cold end of the displacer chamber 200.

At step 348, the working fluid continues exiting the channels 120. The exiting cold fluid displaces the fluid swirling along the hot face (e.g., chamber second face 204*b*) of the cavity (i.e., fluid that is heating) away from the face and back towards the displacer 100 (i.e., back towards displacer second end surface 112*b*). In doing so, the exiting cold fluid can then swirl along the hot face of the cavity. Similarly to step 324, as the cold fluid exits the channels, layers of swirling fluid are created on the hot side of the chamber.

The method 300 then returns to step 304. Since the method 300 is cyclical, the method may begin at a different step other than step 304 (e.g., step 328).

It will be understood that although the displacer 100 may be used as part of a Stirling engine, the displacer 100 may also be used with other types of engines, such as but not limited to Ericsson engines.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without generally departing from the embodiments described herein. For example, while the teachings described and shown herein may comprise certain elements/components and steps, modifications may be made as is known to those skilled in the art. For example, selected features from one or more of the example embodiments described herein in accordance with the teachings herein may be combined to create alternative embodiments that are not explicitly described. All values and sub-ranges within disclosed ranges are also disclosed. The subject matter described herein intends to cover and embrace all suitable changes in technology.

The invention claimed is:

1. A displacer for an engine, the displacer comprising:

a body extending along a displacer longitudinal axis from a displacer first end surface to a displacer second end surface;

at least one channel extending between a first opening in the displacer first end surface and a second opening in the displacer second end surface and having sidewalls therebetween defining a channel flow path, wherein the first opening is located at a first radial distance from the displacer longitudinal axis in a first radial direction and the second opening is located at a second radial distance from the displacer longitudinal axis in a second radial direction; and wherein at least a portion of the channel flow path has a component in an angular direction that is at an angle to both the first and second radial directions.

2. The displacer of claim 1, wherein the component extends an entirety of the channel flow path.

3. The displacer of claim 1, wherein a portion of the channel flow path is parallel to the displacer longitudinal axis.

4. The displacer of claim 1, wherein the body comprises at least three channels.

5. The displacer of claim 1, wherein each of the at least one channels has a circular cross-section.

6. The displacer of claim 1, wherein the cross-section of at least one of the at least one channels is constant along the channel flow path.

7. The displacer of claim 1, wherein the cross-section of at least one of the at least one channels varies along the channel flow path.

8. The displacer of claim 7, wherein the cross-section of at least one of the at least one channels narrows towards the displacer first and second end surfaces.

9. The displacer of claim 1, further comprising a displacer shaft, the displacer shaft extending from the displacer first end surface along the displacer longitudinal axis.

10. The displacer of claim 1, wherein the first and second radial distances are different.

11. The displacer of claim 1, further comprising a regenerator contained within each of the at least one channels.

12. The displacer of claim 11, wherein the regenerator forms a portion of the sidewalls of the at least one channel.

13. The displacer of claim 11, wherein the regenerator is contained within the sidewalls of the at least one channel.

14. The displacer of claim 1, wherein the body is solid and apertures in the body provide the sidewalls for the at least one channel.

15. The displacer of claim 1, wherein the displacer is operably coupled with an external heat source.

16. The displacer of claim 1, wherein the engine is at least one of a Stirling engine and an Ericsson engine.

17. An engine assembly, the engine assembly comprising:

a displacer, the displacer comprising:

a body having a displacer first end surface, a displacer second end surface and a displacer longitudinal axis; and at least one channel extending between a first opening in the displacer first end surface and a second opening in the displacer second end surface and having sidewalls therebetween defining a channel flow path, wherein the first opening is located at a first radial distance from the displacer longitudinal axis in a first radial direction and the second opening is located at a second radial distance from the displacer longitudinal axis in a second radial direction;

wherein at least a portion of the channel flow path has a component in an angular direction that is at an angle to both the first and second radial directions; and a displacer chamber forming an internal cavity, wherein, in the assembled position, the body of the displacer is housed within the internal cavity.

18. The engine assembly of claim 17, wherein the component extends an entirety of the channel flow path.

19. The engine assembly of claim 18, wherein the body comprises at least three channels.

20. The engine assembly of claim 17, wherein a portion of the channel flow path is parallel to the displacer longitudinal axis.

21. A displacer for moving a working fluid in a displacer chamber, the displacer comprising:

a body with a displacer first end surface at one end, a displacer second end surface at another end and a displacer longitudinal axis; and at least one channel extending between the displacer first end surface and displacer second end surface, the at least one channel defining a channel flow path for the working fluid through the displacer, and wherein the at least one channel is angled in a direction that is azimuthal to a radial direction extending from the displacer longitudinal axis to the at least one channel to force the working fluid to swirl as it exits the channel, wherein the displacer chamber is operably coupled with an external heat source.

22. The displacer of claim 21, wherein the at least one channel has a first cross-section at a first point along the channel flow path and a second cross-section at a second point along the channel flow path, and wherein the first cross-section is smaller than the second cross-section.

23. The displacer of claim 21, wherein, in operation, when the displacer is caused to pause at an end of the displacer chamber, the working fluid is caused to swirl while the displacer is paused due to a shape and position of the at least one channel.

* * * * *